United States Patent
Flanders et al.

(10) Patent No.: US 6,768,756 B2
(45) Date of Patent: Jul. 27, 2004

(54) MEMS MEMBRANE WITH INTEGRAL MIRROR/LENS

(75) Inventors: Dale C. Flanders, Lexington, MA (US); Steven F. Nagle, Cambridge, MA (US); Margaret B. Stern, Sudbury, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/804,618

(22) Filed: Mar. 12, 2001

(65) Prior Publication Data

US 2002/0126726 A1 Sep. 12, 2002

(51) Int. Cl.[7] .............................. H01S 3/13; H01S 3/08
(52) U.S. Cl. ...................... 372/43; 372/29.022; 372/75; 372/99; 372/101
(58) Field of Search ................. 372/43, 75, 29.022, 372/99, 101, 107; 359/579; 365/215

(56) References Cited

U.S. PATENT DOCUMENTS

| | | | |
|---|---|---|---|
| 5,245,622 A | * | 9/1993 | Jewell et al. ................. 372/45 |
| 5,291,502 A | * | 3/1994 | Pezeshki et al. ............. 372/20 |
| 6,201,629 B1 | | 3/2001 | McClelland et al. ........ 359/222 |
| 6,271,052 B1 | * | 8/2001 | Miller et al. .................. 438/50 |

FOREIGN PATENT DOCUMENTS

| | | | |
|---|---|---|---|
| DE | 198 51 967 A1 | 5/2000 | ............ G02B/5/10 |
| EP | 0 420 468 A3 | 4/1991 | ............ G02B/26/08 |
| EP | 0 523 861 | 1/1993 | ............ G03F/7/00 |
| WO | WO 99/34484 | 7/1999 | |
| WO | 01/09995 | 2/2001 | ............ H01S/5/00 |

OTHER PUBLICATIONS

Hisanaga, Michio, et al., "Fabrication of 3–Dimensionally Shaped Si Diaphragm Dynamic Focusing Mirror," *Proceedings of the Workshop on Micro Electro Mechanical Systems (MEMS) IEEE*, vol. 6, pp. 30–35 (Feb. 7–10, 1993).

Fletcher, Daniel A.; Crozier, Kenneth B., Kino, Gordon S.; Quate, Calvin F.; Goodson, Kenneth E., "Micromachined Scanning Refractive Lens," Solid–State Sensor and Actuator Workshop, Hilton Head Island, South Carolina, Jun. 4–8, 2000.

* cited by examiner

Primary Examiner—Jerome Jackson
Assistant Examiner—Joseph Nguyen
(74) Attorney, Agent, or Firm—J. Grant Houston (57) ABSTRACT

An optical membrane device and method for making such a device are described. This membrane is notable in that it comprises an optically curved surface. In some embodiments, this curved optical surface is optically concave and coated, for example, with a highly reflecting (HR) coating to create a curved mirror. In other embodiments, the optical surface is optically convex and coated with, preferably, an antireflective (AR) coating to function as a refractive or diffractive lens.

14 Claims, 9 Drawing Sheets

MEMS MEMBRANE WITH INTEGRAL MIRROR/LENS

BACKGROUND OF THE INVENTION

Micro-optical electromechanical system (MEOMS) membranes are used in a spectrum of optical applications. For example, they can be coated to be reflective and then paired with a stationary mirror to form a tunable Fabry-Perot (FP) cavity/filter. They can also be used as stand-alone reflective components to define the end of a laser cavity, for example.

Typically, membrane deflection is achieved by applying a voltage between the membrane and a fixed electrode. Electrostatic attraction moves the membrane in the direction of the fixed electrode as a function of the applied voltage. This results in changes in the reflector separation of the FP filter or cavity length in the case of a laser.

In optical systems, these membranes have advantages over cantilevered structures, for example. Membranes better maintain parallelism through the range of their deflection and tend to be more mechanically robust and have fewer relevant vibration modes.

In the past, the commercial MEOMS membranes have been produced by depositing a dielectric mirror structure over a sacrificial layer, which has been deposited on a support structure. This sacrificial layer is subsequently etched away to produce a suspended membrane structure in a release process. If a curved membrane structure is desirable, a compressive stress is cultivated in the silicon compound to induce a bow.

SUMMARY OF THE INVENTION

In number of applications, it would be desirable to fabricate membranes with predetermined optically curved surfaces that work in transmission or reflection, such as 1) refractive lens structures, including lenses with continuous curvatures or Fresnel profiles; 2) diffractive lens or mirror structures; or 3) mirror structures having continuous curvatures or Fresnel profiles.

The present invention concerns an optical membrane device and method for making such a device. This membrane is notable in that it comprises an optically curved surface. In some embodiments, this surface is optically concave and coated, for example, with a highly reflecting (HR) coating to create a curved mirror. In other embodiments, the optical surface is optically convex and coated with, preferably, an antireflective (AR) coating to function as a collimating or focusing lens.

In general, according to one aspect, the invention features an optical membrane device that comprises a support and a device layer, wherein a deflectable membrane structure is formed in the device layer. A sacrificial layer separates the support from the device layer. This sacrificial layer has been selectively removed to release the membrane structure. According to the invention, an optically curved surface has been formed on this deflectable membrane.

In one example, the curved optical surface is formed in an optical element layer that is deposited on the device layer. Alternatively, the curved optical surface is etched into the device layer.

In one implementation, the curved optical surface is an optically concave surface that has been etched into the device layer. This optically concave surface is formed as either a continuously curved, a Fresnel, or diffractive surface. In another implementation, the optical surface is an optically convex shape that is formed in a layer that has been deposited on the devices layer or that has been etched into the device layer. This optically convex shape is formed either as a continuous curved surface, a Fresnel surface or using diffractive features.

In the present implementation, the sacrificial layer defines an electrical cavity across which electrical fields are established to deflect the membrane structure in the direction of the support or stationary electrode. In one example, this membrane structure comprises a center body portion, an outer portion, and tethers that extend between the center body portion and the outer portion.

In one application, an optical coating is applied to the optically curved surface. For example, a concave mirror structure is formed by applying a multi-layer dielectric mirror coating to the curved optical surface. In another example, an anti-reflective coating is applied to a convex optical surface to thereby form a refractive or diffractive lens element.

In general, according to another aspect, the invention also features a process for fabricating an optical membrane structure. This process comprises providing a support and forming a sacrificial layer on the support. A device layer is then further formed on this sacrificial layer. A membrane structure is patterned into the device layer and the membrane structure released by the selective removal of the sacrificial layer. Finally, according to the invention, an optically curved surface is formed on the membrane structure of the device layer.

In one embodiment, the process for fabricating the curved optical surface comprises depositing a photo-resist layer and then reflowing that photo-resist layer to create a curved surface. This curved surface is then transferred into the device layer by etching the photo-resist and the device layer.

To form a convex optical surface, a columnar photo-resist layer is reflowed to form a convex surface. In contrast, to create a concave surface, a columnar blind hole is etched into a photo-resist layer or the device layer. This columnar blind hole is then over-coated with another photo-resist layer and then the resulting concave surface transferred into the device layer by etching.

In general, according to still another aspect, the invention features a process for fabricating concave mirror structures. This process comprises depositing a photo-resist layer over a well or blind hole in a substrate. In one example, this substrate is limited to simply a device layer. In another example, this substrate comprises a multi-layer structure, such as a device layer, which has been coated with another photo-resist layer. A resulting curved surface is then transferred into the substrate by etching the photo-resist and the substrate. This curved surface is then coated with a dielectric mirror coating to thereby yield a concave mirror structure.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
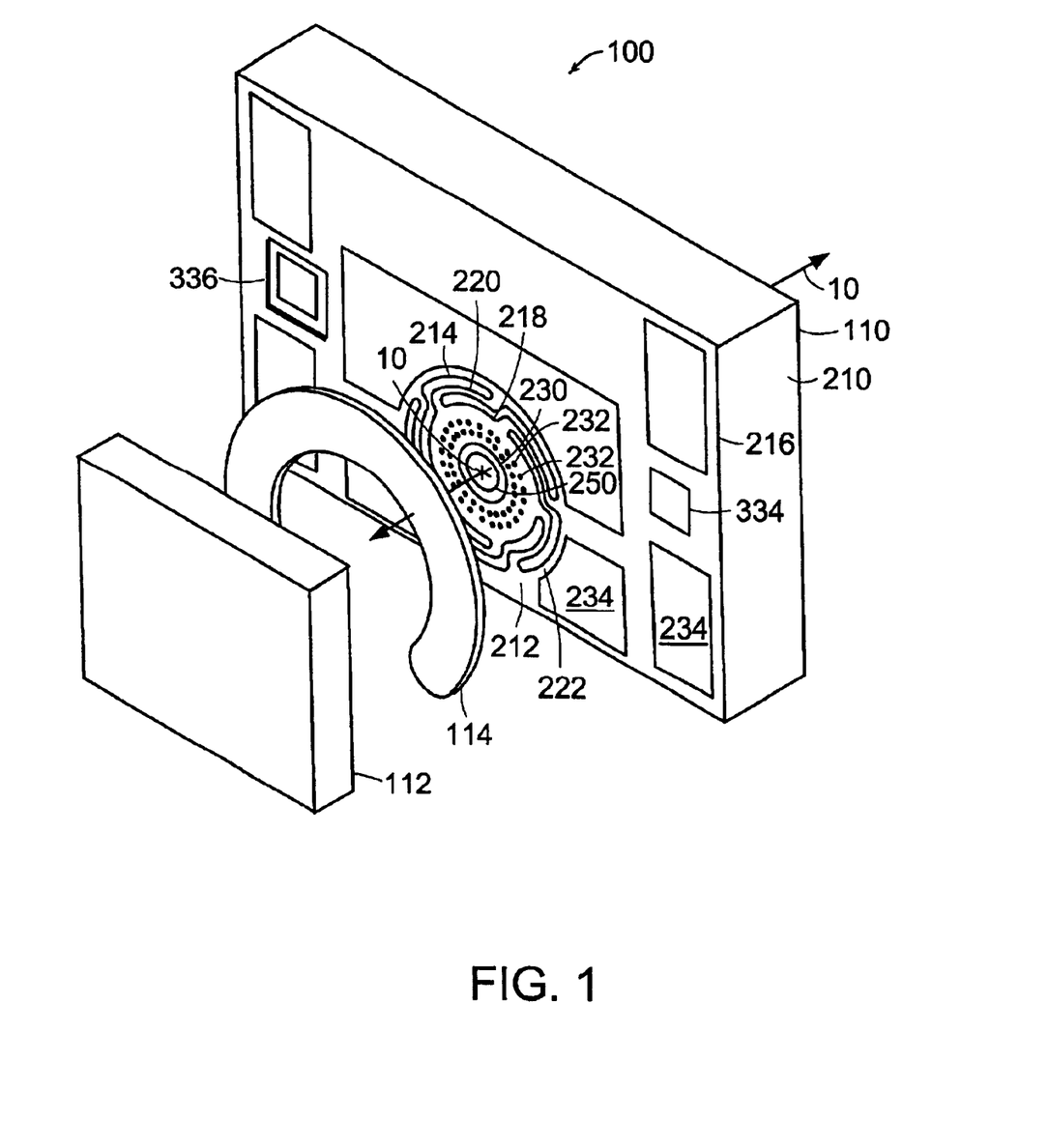
FIG. 1 is a perspective, exploded view of a tunable filter comprising an optical membrane device with an optically curved mirror structure, according to the present invention.

FIG. 1 shows a Fabry-Perot tunable filter 100 comprising an optical membrane device 110, which has been constructed according to the principles of the present invention.

Generally, in the FP filter 100, a spacer device 114 separates the mirror device 112 from the membrane device 110 to thereby define a Fabry-Perot (FP) cavity.

The optical membrane device 110 comprises handle material 210 that functions as a support. Preferably, the handle material is wafer material such as from a silicon handle wafer, which has been subsequently singulated into the illustrated device.

An optical membrane or device layer 212 is added to the handle wafer material 210. The membrane structure 214 is formed in this optical membrane layer 212. In the current implementation, the membrane layer 212 is silicon. An insulating layer 216 separates the optical membrane layer 212 from the handle wafer material 210.

During manufacture, the insulating layer 216 functions as a sacrificial/release layer, which is partially removed to release the membrane structure 214 from the handle wafer material 210. Currently, the membrane layer is manufactured from a silicon wafer that has been bonded to the insulating layer under elevated heat and pressure.

In the current embodiment, the membrane structure 214 comprises a body portion 218. The optical axis 10 of the device 100 passes concentrically through this body portion 218 and orthogonal to a plane defined by the membrane layer 212. A diameter of this body portion 218 is preferably 300 to 600 micrometers; currently it is about 500 micrometers.

Tethers 220 extend radially from the body portion 218 to an outer portion 222, which comprises the ring where the tethers 220 terminate. In the current embodiment, a spiral tether pattern is used.

According to the invention, an optically curved surface 250 is disposed on the membrane structure 214. This optically curved surface 250 forms an optical element. In the illustrated implementation of the membrane device 110, the surface of the optical element is optically concave to thereby form a curved mirror/flat mirror FP filter cavity in conjunction with the mirror device 112.

An optical coating dot 230 is typically deposited on the body portion 218 of the membrane structure 214, specifically covering the optically curved surface 250 of the optical element. In the implementation as a Fabry-Perot filter or other reflecting membrane, the optical dot 230 is preferably a highly reflecting (HR) dielectric mirror stack, comprising 6 or more layers of alternating high and low index material. This yields a highly reflecting, but low absorption, structure that is desirable in, for example, the manufacture of high finesse Fabry-Perot filters.

In the illustrated embodiment, artifacts of the manufacture of the membrane structure 214 are etchant holes 232. These holes allow an etchant to pass through the body portion 218 of the membrane structure 214 to assist in the removal of the insulating layer 216 during the release process.

In the illustrated embodiment, metal pads 234 are deposited on the proximal side of the membrane device 210. These are used to solder bond, for example, the spacing structure 214 onto the proximal face of the membrane device 210, which could be avoided if the spacing structure 214 is formed to be integral with the membrane device 110 or mirror device 112. Bond pads 234 are also useful when installing the filter 100 on a micro-optical bench, for example. Also provided are a membrane layer wire bond pad 334 and a handle wafer wire bond pad 336. The membrane layer bond pad is a wire bonding location for electrical control of the membrane layer. The handle wafer bond pad 336 is a wire bond pad for electrical access to the handle wafer material.

Figure 2:
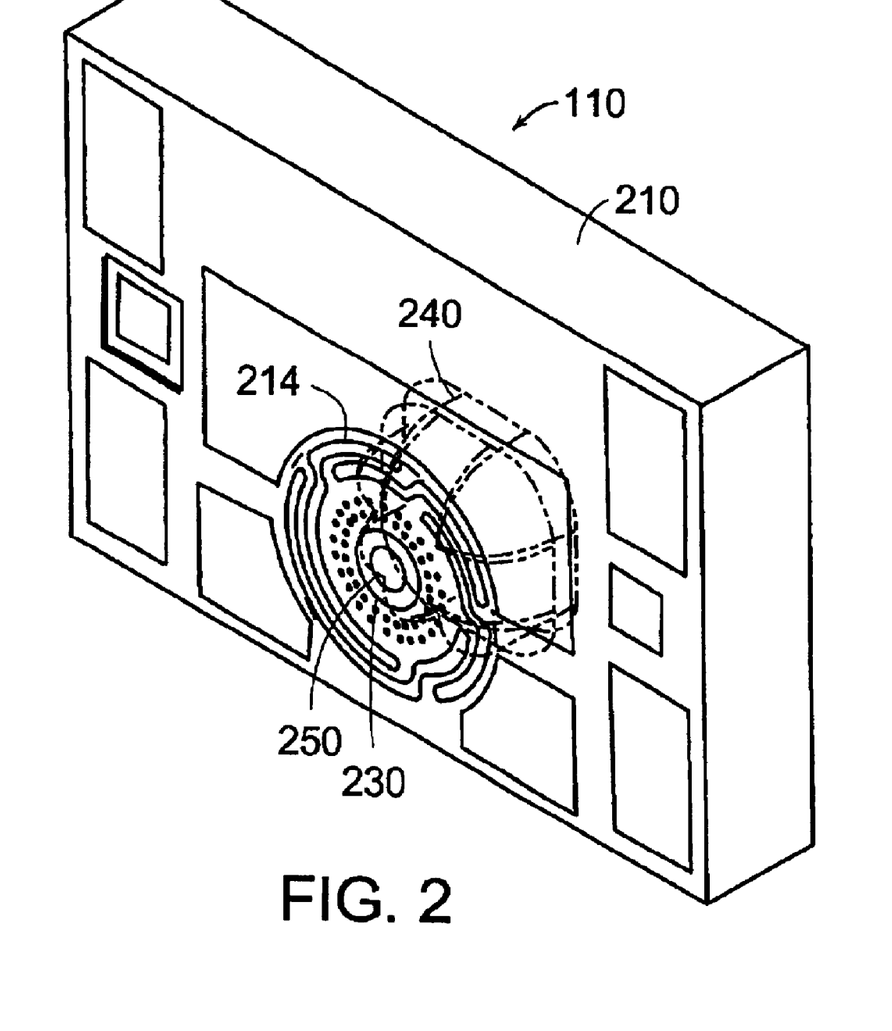
FIG. 2 is a perspective view of the inventive optical membrane device including an optically convex or concave surface and showing the backside optical port, in phantom.

FIG. 2 illustrates the membrane device 110 with the optically curved surface 250 of the optical element in an unpaired configuration, i.e., without mirror device 110. In this configuration, an optically concave surface 250, providing a concave optical element, is used as, for example, a reflector in a laser cavity. In such an application, an optical port 240 (shown in phantom) is provided, extending from a distal side of the handle wafer material 210 to the membrane structure 214 in cases where the reflector is used as an output reflector or to provide for monitoring. If the reflector is used as a back reflector, then the port 240 is not necessary in some cases.

Further, whether or not this optical port 214 is required also depends upon the transmissivity of the handle wafer material 210 at the optical wavelengths over which the membrane structure 110 must operate. Typically, with no port, the handle wafer material along the optical axis must be AR coated if transmission through the backside is required for functionality.

In another configuration, the optical surface 250 of the optical element is an optically convex surface and AR coated to function as a collimating or focusing lens optical element, a position of which is modulated along the optical axis 10 to thereby control the location of a focal point or beam waist, in one application.

According to the invention, the optically convex and optically concave surface 250 is formed either as a surface with a continuous curvature, a stepped curvature of a Fresnel structure, or with refractive structures.

Figure 3:
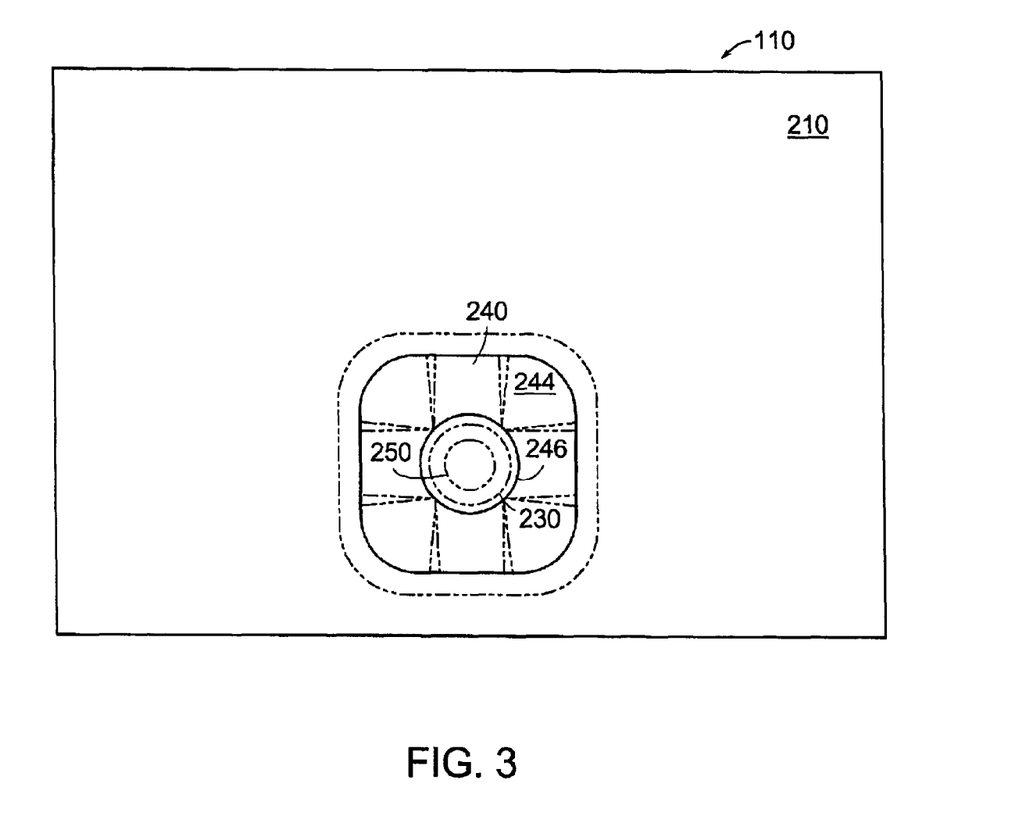
FIG. 3 is an elevation view of the distal side of the inventive optical membrane device showing the optical port with the lens or mirror structure, in phantom.

FIG. 3 shows the optical port 240 formed through the distal side of the handle wafer material 210 in the optical membrane device 110, if necessary or desirable. Specifically, the optical port 240 has generally inward sloping sidewalls 244 that end in the port opening 246. As a result, looking through the distal side of the handle wafer material, the body portion 218 of the membrane structure is observed. The port is preferably concentric with the optical coating 230 and the optical surface 250.

FIGS. 4A through 4D illustrate a process for fabricating a membrane device according to the present invention.

Figure 4A:
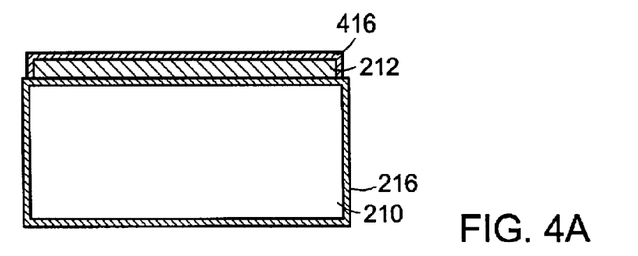
FIGS. 4A through 4D are schematic cross-sectional views illustrating a process for fabricating a membrane device according to the present invention.

Referring to FIG. 4A, the process begins with a support or handle wafer 210, which in one embodiment is a standard n-type doped silicon wafer. The handle wafer 210 is 75 mm to 150 mm in diameter, for example.

The wafer 210 is oxidized to form the sacrificial insulating layer 216. The sacrificial insulating layer 216 defines the electrostatic cavity in the illustrated embodiment. Presently, the insulating layer is 216 is between 3.0 and 6.0 $\mu$m.

The membrane or device layer 212 is then deposited or otherwise installed on the sacrificial insulating layer 216. Preferably, the membrane layer 212 is 6 to 10 $\mu$m in thickness. Such thickness range provides adequate structural integrity while not making the structure overly rigid or brittle. This layer can be formed from a range of materials such as silicon wafer material or polysilicon.

The membrane layer 212 can be annealed and polished back to the desired membrane thickness, if necessary. A thin oxide layer 416 is preferably then grown on the membrane layer 212 to function as an etch protection layer.

Figure 4B:
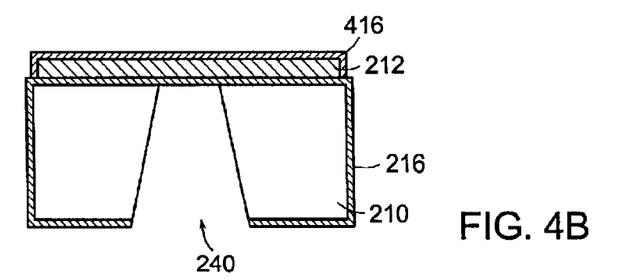

As shown in FIG. 4B, the optical port 240 is patterned and etched into the handle or support wafer 210 in a backside etch process, preferably using a combination of isotropic and anisotropic etching. The sacrificial insulating layer 216 is used as an etch stop.

Alternatively, the optical port etch step can be omitted, as silicon is partially transparent at infrared wavelengths. In such implementation, an anti-reflective (AR) coating is applied to the outer surface of handle wafer 210 and other air-silicon interfaces to minimize reflection from the interfaces.

Figure 4C:
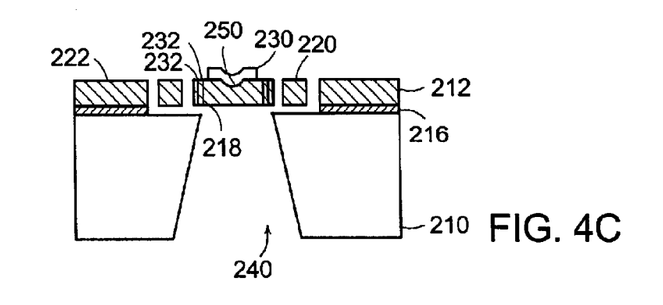

FIG. 4C illustrates formation of the optical surface 250, which is concave in the illustrated example. The highly reflective (HR) spot 230 is then deposited on the optical surface in the case of a reflector. AR coatings are typically used with lens. Specifically, the HR spot 230 is formed by depositing and etching-back using a patterned photo-resist layer or deposition through a shadow mask. The HR coating is preferably a multi-layer coating of 4 more layers, preferably 8 or more, with a 16 dielectric layer mirror being used in the current embodiment. The preferred method of etching the dielectric coatings 230 is to use a dry etch process, such as reactive ion etching or reactive ion milling.

Also shown is the formation membrane structure including the tethers 220, membrane body 218, and outer portion 222 in the membrane layer 212. Specifically, a photoresist layer is deposited and patterned with the membrane structure pattern. It also functions to protect the HR spot 230, in one embodiment. The release process is performed in which an etchant is used to remove the insulation layer 212 from underneath the membrane structure.

Figure 4D:
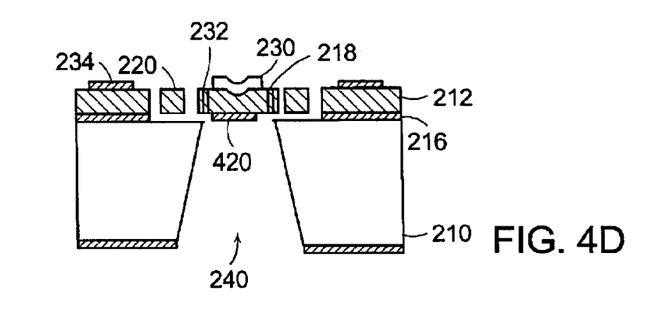

Finally, as shown in FIG. 4D, an anti-reflection (AR) coating 420 is deposited through the optical port 240 onto the exterior surface of the membrane. Further, metal pads 234 are added.

Figure 5A:
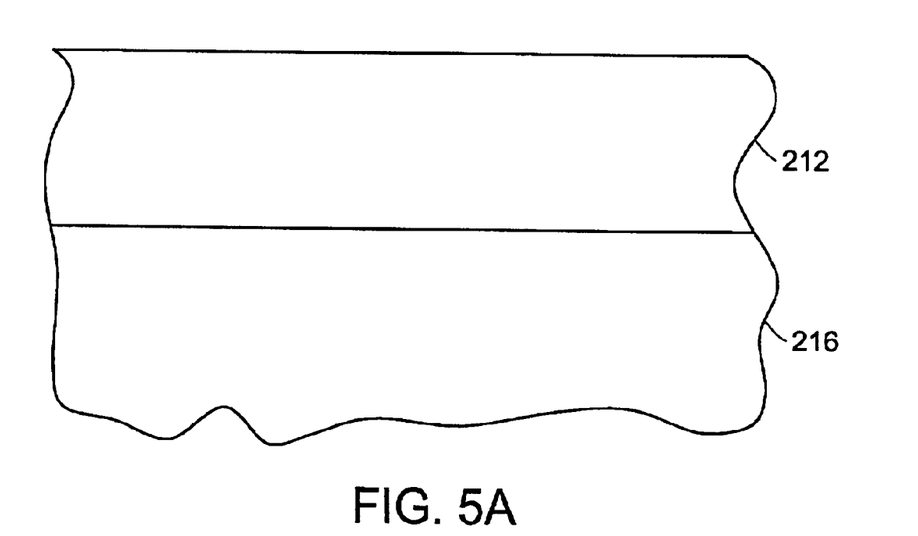
FIGS. 5A through 5E are detailed schematic cross-sectional views illustrating the fabrication for the membrane optical element according to a first embodiment.

FIG. 5A is a partial cross-sectional view showing the device layer 212 and the sacrificial layer 216 in the region of the device layer where the optical surface is to be formed.

Figure 5B:
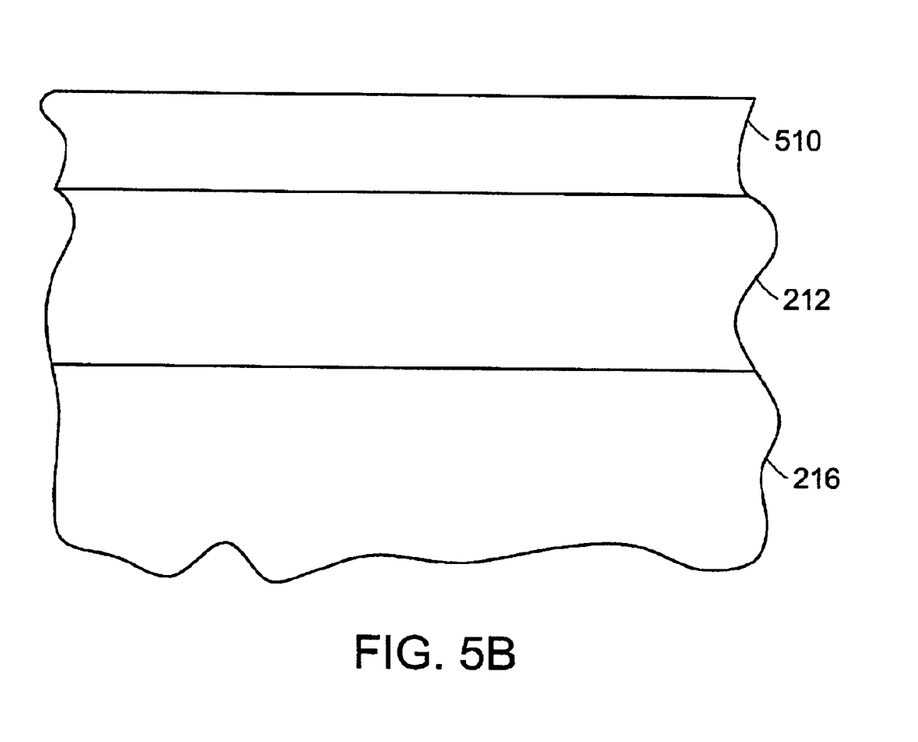

FIG. 5B shows a first step of the process in which a patterning layer, such as a photo-resist layer 510 is deposited on the device layer 212.

Figure 5C:
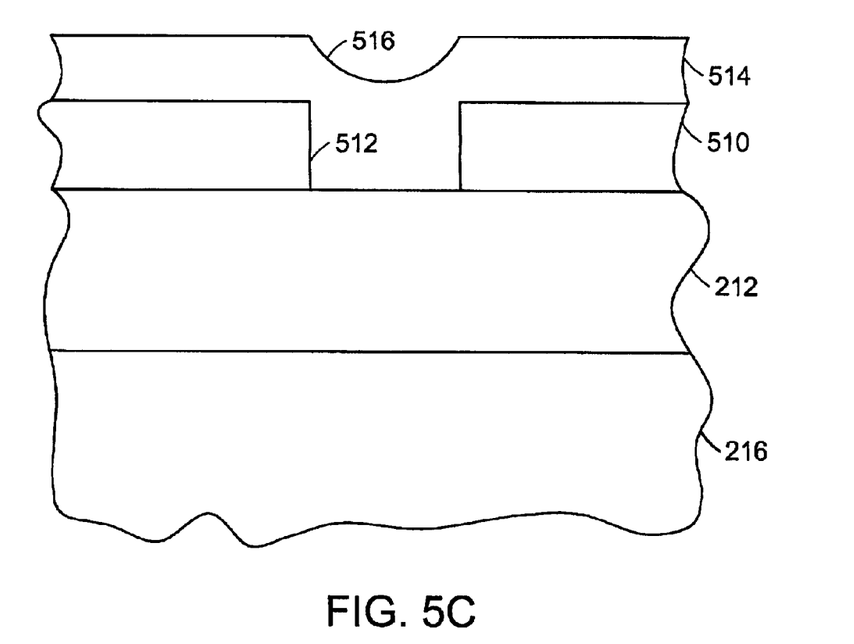

As illustrated in FIG. 5C, the photo-resist layer 510 is patterned to have a columnar blind hole 512. In the illustrated example, this columnar hole extends to the device layer 212.

A second photo-resist layer 514 is then deposited and spun-over the first photo-resist 510 and specifically, the blind hole 512. The surface characteristics of this concave region 516 can optionally be improved by reflowing the resist under elevated temperatures. In the preferred embodiment, resist layers 510 and 512 are selected to have similar or the same etch rates as the device layer 212.

Figure 5D:
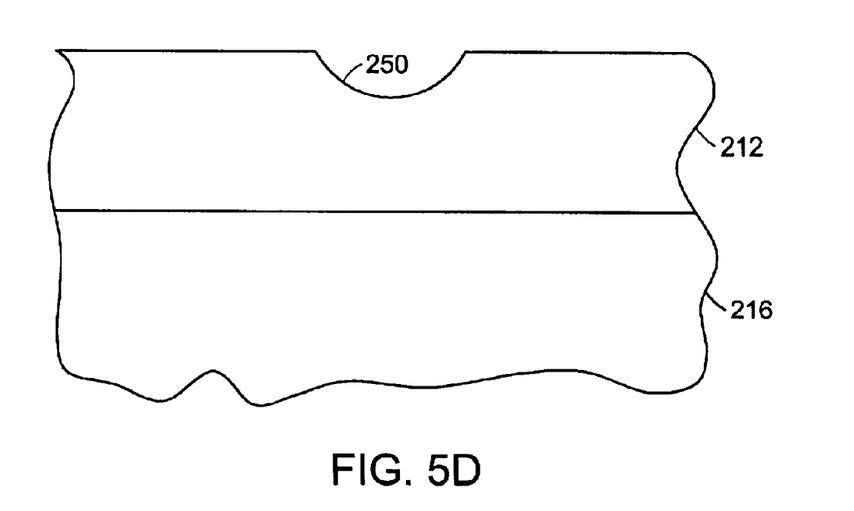

As a result, as illustrated in FIG. 5D, when the device is exposed to a nominally anisotropic, non-selective etch, the curved surface 516 is transferred into the device layer 512 to thereby form the optically curved surface 250. In other embodiments, partially selective etches are used to modify the curved surface during the transfer.

Figure 5E:
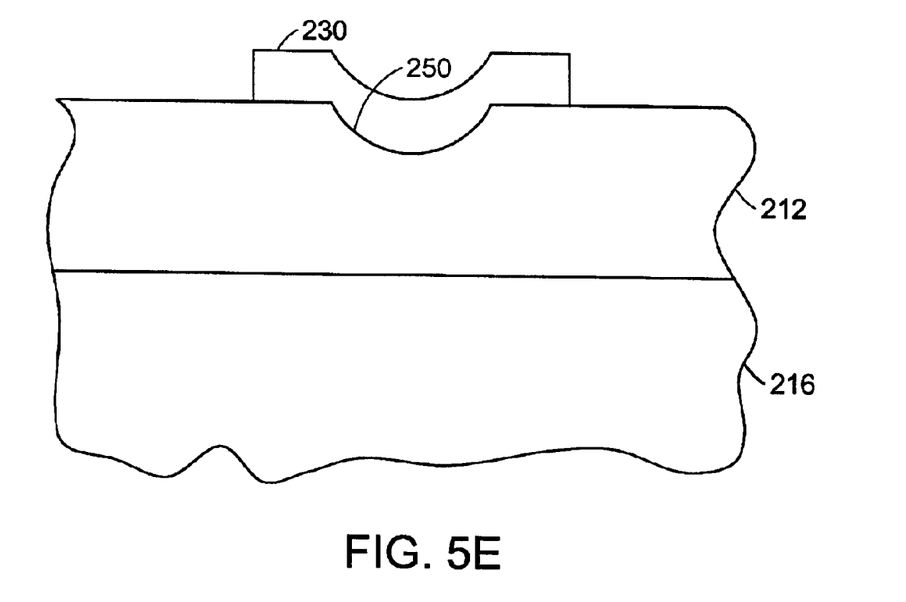

Subsequently, as illustrated in 5E, the optical surface 250 is then coated with an optical coating 230. Depending on the implementation, this optical coating 230 is either an AR or HR coating.

Figure 6A:
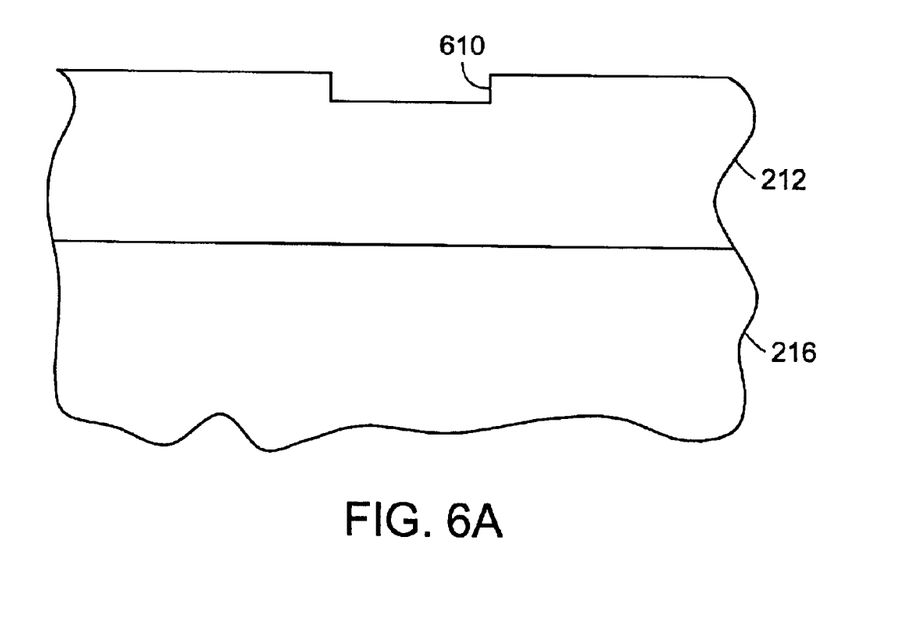
FIGS. 6A through 6C are detailed schematic cross-sectional views illustrating the fabrication for the membrane optical element according to a second embodiment.
Figure 6B:
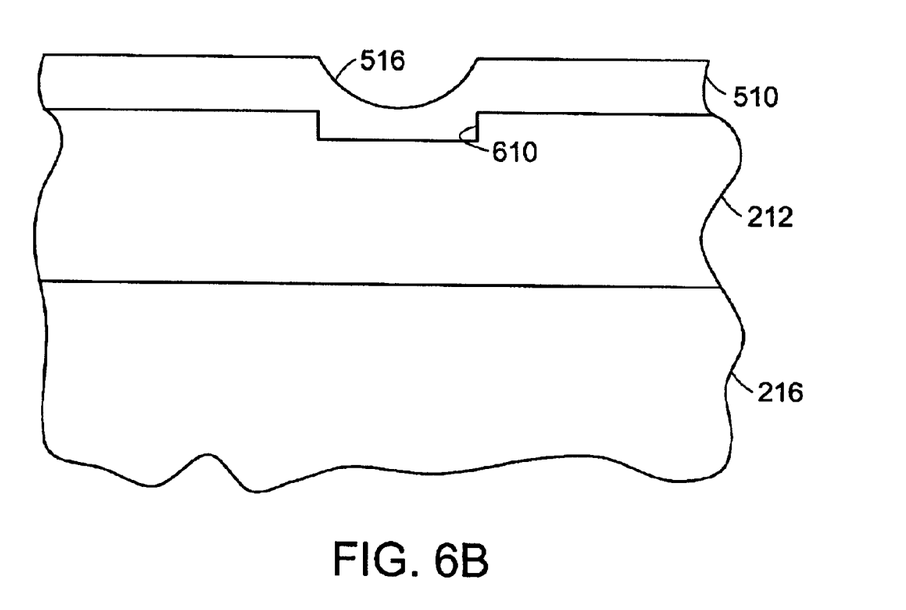
Figure 6C:
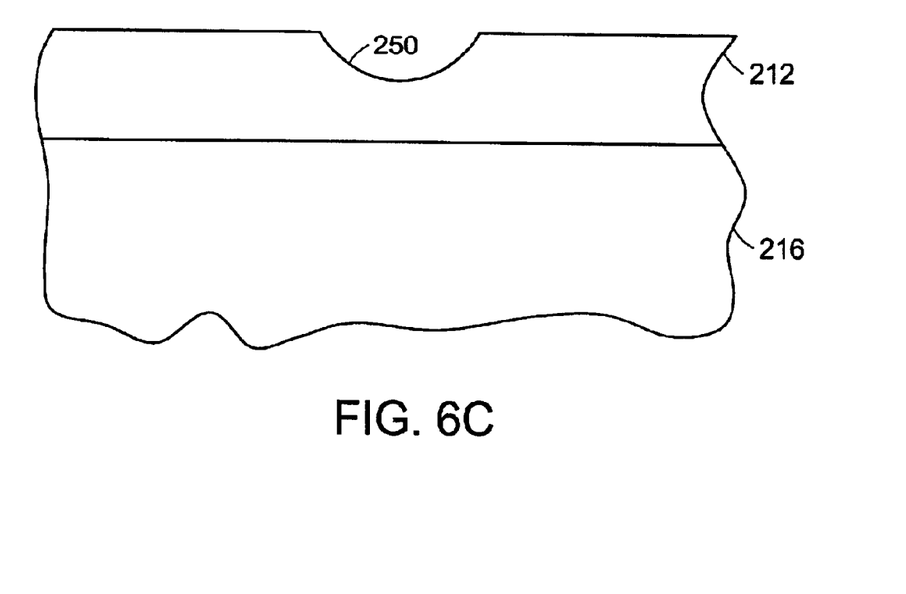

FIGS. 6A–6C illustrate other techniques for fabricating the optical surface. In this example, a blind hole 610 is etched into the device layer 212.

This blind hold 610 can be directly converted into the curved optical surface 250 that is illustrated in FIG. 6C by a mass transport process. Such mass transport processes, however, assume that the device can withstand the required high processing temperatures, which may not be true in all instances.

As a result, the more typical implementation is illustrated in FIG. 6B. Specifically, a photoresist layer 510 is deposited over the device layer 512 similar to that step as illustrated in FIG. 5C. The curved surface 516 is created using the conformal deposition or facilitated with resist reflow. The resist layer 510 and the device layer 512 are then etched to transfer the curved optical surface 250 into the remainder of the device layer 212.

Figure 7A:
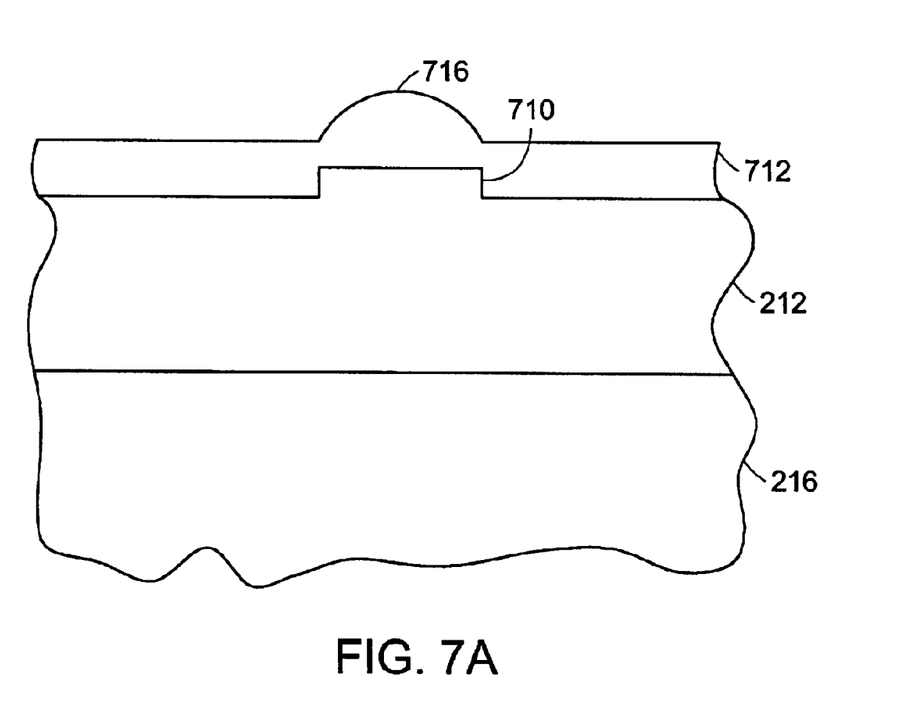
FIGS. 7A through 7B is detailed schematic cross-sectional views illustrating the fabrication for the membrane optical element according to a third embodiment.
Figure 7B:
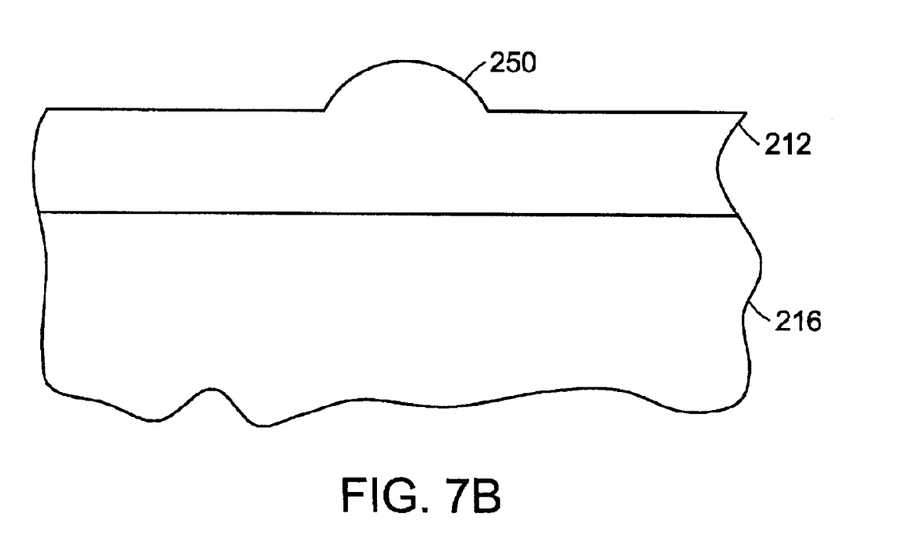

FIGS. 7A and 7B illustrate a related process for fabricating a convex surface on the device layer 212. Specifically, a columnar structure 710 is formed on the device layer 212 by etching the surrounding regions of the device layer 212. Then, a photoresist layer 712 is deposited over the device layer 212 and reflowed, if necessary.

Then, as illustrated in FIG. 7B, the photoresist 712 and device layer 212 are etched to transfer the curved surface 714 of the photo-resist 712 into the device layer 212.

While this invention has been particularly shown and described with references to preferred embodiments thereof, it will be understood by those skilled in the art that various changes in form and details may be made therein without departing from the scope of the invention encompassed by the appended claims. For example, in still other implementations, the photo resist is patterned using gray-scaling techniques.

What is claimed is:

1. An optical membrane device comprising
   a support;
   a device layer in which a deflectable membrane structure is formed;
   a sacrificial layer separating the support from the device layer, the sacrificial layer being selectively removed to release the membrane structure; and
   an optically curved surface on the deflectable membrane and on an optical axis of the optical membrane device.

2. An optical membrane device as claimed in claim 1, wherein the optical surface is formed in an optical element layer that is deposited on the device layer.

3. An optical membrane device as claimed in claim 1, wherein the optical surface is etched into the device layer.

4. An optical membrane device as claimed in claim 1, wherein the optical surface is a concave surface that is formed into the device layer.

5. An optical membrane device as claimed in claim 1, wherein the optical surface is a convex surface that is etched into the device layer.

6. An optical membrane device as claimed in claim 5, wherein the sacrificial layer defines an electrical cavity across which electrical fields are established to deflect the membrane structure in a direction of the support.

7. An optical membrane device as claimed in claim 6, wherein the membrane structure comprises:

a center body portion;

an outer portion, which is at least partially supported by the sacrificial layer; and tethers that extend between the center body portion and the outer portion.

8. An optical membrane device as claimed in claim 1, wherein the sacrificial layer defines an electrical cavity across which electrical fields are established to deflect the membrane structure in a direction of the support.

9. An optical membrane device as claimed in claim 1, wherein the membrane structure comprises:

a center body portion;

an outer portion, which is at least partially supported by the sacrificial layer; and tethers that extend between the center body portion and the outer portion.

10. An optical membrane device as claimed in claim 1, further comprising an optical coating deposited over the optical surface.

11. An optical membrane device as claimed in claim 10, wherein the optical coating is multilayer dielectric mirror.

12. An optical membrane device as claimed in claim 10, wherein the optical coating is an antireflective coating.

13. An optical membrane device as claimed in claim 1, wherein the optically curved surface of the deflectable membrane is centered on the optical axis of the optical membrane device.

14. An optical membrane device as claimed in claim 1, wherein the optically curved surface of the deflectable membrane is centered on the deflectable membrane.

* * * * *